(12) United States Patent
Right et al.

(10) Patent No.: US 8,548,126 B2
(45) Date of Patent: Oct. 1, 2013

(54) POLARIZED TELEPHONE SYSTEM FOR 3-STATE AND 4-STATE SYSTEMS

(75) Inventors: Robert Right, Bradenton Beach, FL (US); Keith Morrow, Milton, NH (US); Hilario Costa, Myakka, FL (US)

(73) Assignee: UTC Fire & Security Americas Corporation, Inc., Bradenton, FL (US)

( * ) Notice: Subject to any disclaimer, the term of this patent is extended or adjusted under 35 U.S.C. 154(b) by 1867 days.

(21) Appl. No.: 11/150,483

(22) Filed: Jun. 13, 2005

(65) Prior Publication Data

US 2007/0008106 A1    Jan. 11, 2007

(51) Int. Cl.
*H04M 11/04* (2006.01)

(52) U.S. Cl.
USPC .............................. 379/49; 379/48

(58) Field of Classification Search
USPC ........... 379/36–50, 286.05, 287, 293, 387.01, 379/370, 426, 428.02, 433.01, 424, 433.04
See application file for complete search history.

(56) References Cited

U.S. PATENT DOCUMENTS

| 3,646,575 | A | * | 2/1972 | Heirbaut et al. | 379/146 |
|---|---|---|---|---|---|
| 3,649,760 | A | * | 3/1972 | Glidden | 379/282 |
| 4,140,881 | A | * | 2/1979 | Clenney | 379/401 |
| 4,710,949 | A | * | 12/1987 | Ahuja | 379/27.06 |
| 4,815,126 | A | * | 3/1989 | Goode et al. | 379/359 |
| 4,969,179 | A | * | 11/1990 | Kanare et al. | 379/33 |
| 5,818,905 | A | * | 10/1998 | Ohno | 379/30 |
| 7,162,028 | B2 | * | 1/2007 | Lieder et al. | 379/399.01 |

* cited by examiner

*Primary Examiner* — Md S Elahee
*Assistant Examiner* — Akelaw Teshale
(74) *Attorney, Agent, or Firm* — MH2 Technology Law Group LLP

(57) ABSTRACT

A firefighter's telephone communication system is provided that includes a polarized telephone station that may be connected to either 3-state (detection of normal, open, or call-in) or 4-state (detection of normal, open, short, or call-in) telephone control panel, without the need to alter the telephone station.

5 Claims, 3 Drawing Sheets

POLARIZED TELEPHONE SYSTEM FOR 3-STATE AND 4-STATE SYSTEMS

FIELD OF THE INVENTION

The present invention generally relates to a building fire alarm evacuation and fire-fighter's communication system for alerting individuals within a protected area of the presence of an emergency situation. More particularly, the present invention relates to the design and application of a fire-fighter's telephone station that can be used in either a 3-state or 4-state operational system with the use of the same fire-fighter's telephone station and without the need to change switch settings, jumpers, or the like.

BACKGROUND OF THE INVENTION

Fire alarm systems used in buildings and such are designed to save lives and include a number of components and devices such as smoke and heat sensors, audible and visible indicators, and a fire-fighter's telephone system.

Additional equipment used by firefighters are two-way radios that fire personnel routinely use for communications. However, today's large modern buildings challenge the operation of these two-way radios. In order to provide fire personnel with reliable communication throughout the building, a dedicated wired firefighter's telephone system is commonly installed as part of the fire alarm system. The fire fighter's system consists of dedicated telephone stations strategically located in corridors, lobbies, mechanical control centers, stairwells, and other locations important to the fire fighting effort.

There are generally two types of telephone stations: 1) one that utilizes a hook-type cradle switch that signals the receiving end at the fire alarm control panel that an off-hook condition exists indicating a call-in is being requested at the outlying location, and 2) one that utilizes a portable plug-in handset that the fire personnel carry out to the outlying location and plugs into a wall-mounted receptacle that signals the receiving end at the fire alarm control panel that a call-in is being requested at the outlying location.

In either case, the fire fighter's telephones activate audible and visible signals at the fire alarm control panel indicating the outlying fire personnel is requesting communications with the fire alarm control panel operator. By answering the call-in request at the fire alarm control panel, the remote location is connected and communications may commence. Additional incoming calls from other fire fighters' telephones may also be selected at the fire alarm control panel similar to a party-line configuration.

Referring to FIG. 1, a conventional firefighter's telephone system 100 includes a microphone 105 and receiver 110 electrically connected to an R1 resister 120 and a C1 capacitor 125 as shown. A non-polarized telephone line 115 is generally utilized. Conventional firefighter's telephone systems 100 provide an additional feature not available on conventional telephone systems in that wiring supervision is provided so as to ensure the wiring between the outlying telephone station and fire alarm control panel is in tact and available during an emergency situation.

Traditionally, it has only been required to monitor the integrity for an open wiring condition between the firefighter's telephone station and the fire alarm control panel. An open wire will notify building management of the trouble condition and will limit the operational capability of the system until the fault is corrected.

In addition, it has not been convention to monitor the integrity of the wiring connection between the firefighter's telephone station and the fire alarm control panel for a shorted wiring condition because of the difficulty in distinguishing between the shorted wiring and the low impedance that normally results from an off-hook condition.

SUMMARY OF THE INVENTION

An improved firefighter's telephone station that allows monitoring for both a) traditional 3-state operation, (normal, open wiring, call-in), and b) improved 4-state operation, (normal, open wiring, shorted wiring, and call-in). In other words, the improved firefighter's telephone station allows distinction between a call-in signal and shorted wiring when connected to 4-state systems; and may also be connected to 3-state systems without any modifications.

The foregoing needs are met, to a great extent, by the present invention, wherein in one aspect an apparatus is provided that in some embodiments provides a single polarized firefighter's telephone station that is polarity sensitive so that the wiring connected to it in one polarity causes the firefighter's telephone station to act as a 3-state device, and when connected in the opposite polarity acts as a 4-state device.

In accordance with another aspect of the present invention, the new and improved firefighter's telephone station may be connected to older or existing telephone control panels that are only capable of 3-state operation, in one polarity, and connected to new telephone control panels that are capable of 4-state operation in the opposite polarity, without the need to make any modifications, switch settings, jumpers, or the like.

There has thus been outlined, rather broadly, certain embodiments of the invention in order that the detailed description thereof herein may be better understood, and in order that the present contribution to the art may be better appreciated.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions in so far as they do not depart from the spirit and scope of the present invention.

DETAILED DESCRIPTION

Figure 2:
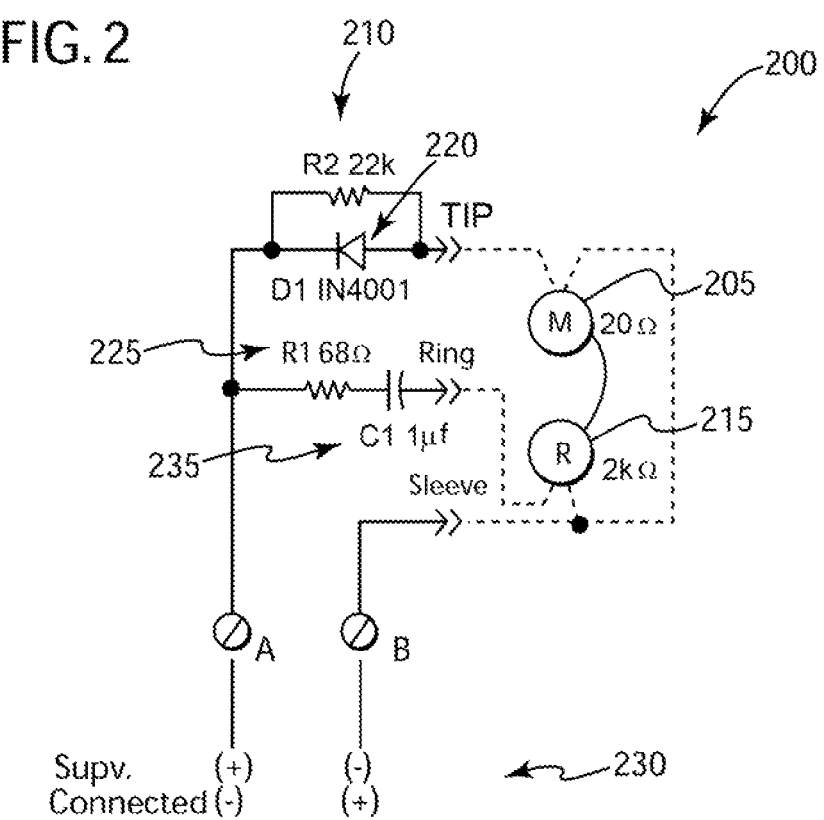
FIG. 2 is a diagrammatic representation of a firefighter's telephone station that includes a polarizing diode and resistor according to a preferred embodiment of the invention.

The invention will now be described with reference to the drawing figures, in which like reference numerals refer to like parts throughout. As shown in FIG. 2, an embodiment in accordance with the present invention provides a polarized telephone system 200 including a microphone 205 and receiver 215, electrically connected to an R1 resistor 225, a D1 diode 220, an R2 resistor 210, a C1 capacitor 235, and a polarized telephone line 230.

Referring to FIG. 2, in this example, microphone 205 and receiver 215 are part of a portable handset that could be carried out to a remote location in a building by fire personnel and plugged into a telephone receptacle.

Once plugged in, the DC resistance placed across the field-wiring and telephone control panel circuit 300 would be reduced, and dependant on the impedance of the handset microphone 205, typically a low value. This has the effect of allowing current to flow.

This low impedance is typically detected at a telephone control panel 300 to indicate a call-in signal, or in other words, a telephone receptacle has been activated. The shortcoming of this configuration and operation is that it is virtually impossible to distinguish between a plugged-in telephone, which represents low impedance, and a shorted pair of wires, which also represents low impedance, between the telephone receptacle and telephone control panel 300. Therefore, in this embodiment, while it is possible to detect normal, open wiring, and a plugged-in handset, detecting shorted wiring is prohibited.

Referring to FIG. 2, this figure is a diagrammatic representation of the improved firefighter's telephone station that includes the addition of a polarizing diode 220 and resistor 210 according to a preferred embodiment of the invention.

Figure 1:
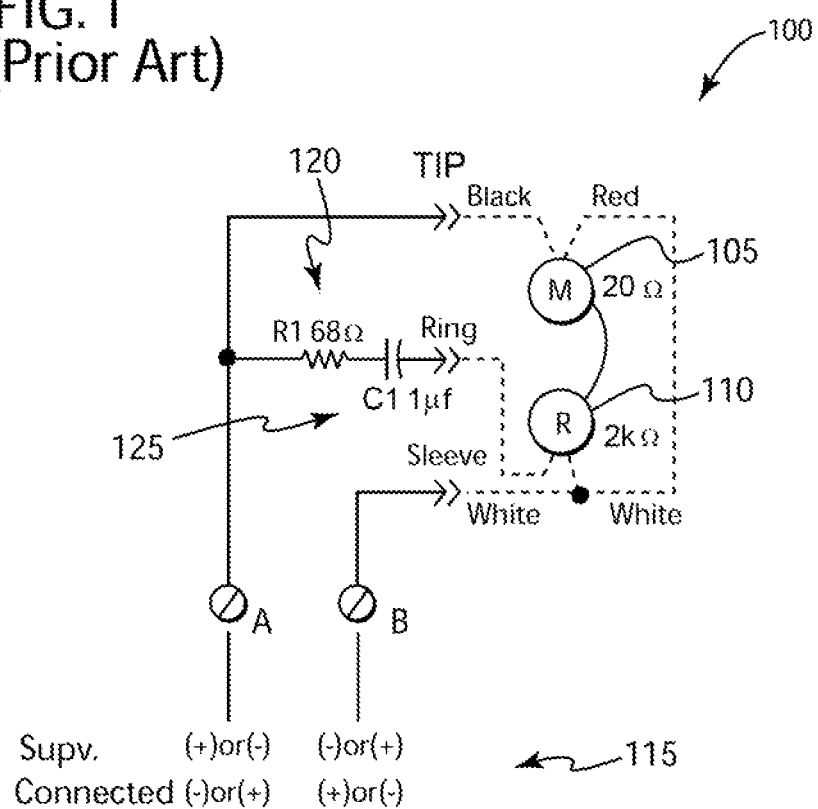
FIG. 1 is a diagrammatic representation of a conventional firefighter's telephone station.

In FIG. 2, microphone 205 is now polarized so that when the firefighter's telephone is connected to the telephone control panel 300 in the proper polarity, and when the portable handset is plugged-in, R2 resistor 210, is placed in the circuit allowing the call-in impedance to be higher than the microphone 205 impedance as in FIG. 1. This allows the telephone control panel 300 to differentiate between a shorted line and a plugged-in handset. Once the telephone control panel operator recognizes the call-in signal, the remote telephone is connected and the polarity is reversed to the telephone and the D1 diode 220 conducts shunting the R2 resistor 210, allowing the microphone 205 to be connected to the circuit without the impedance of resistor 210.

Figure 3:
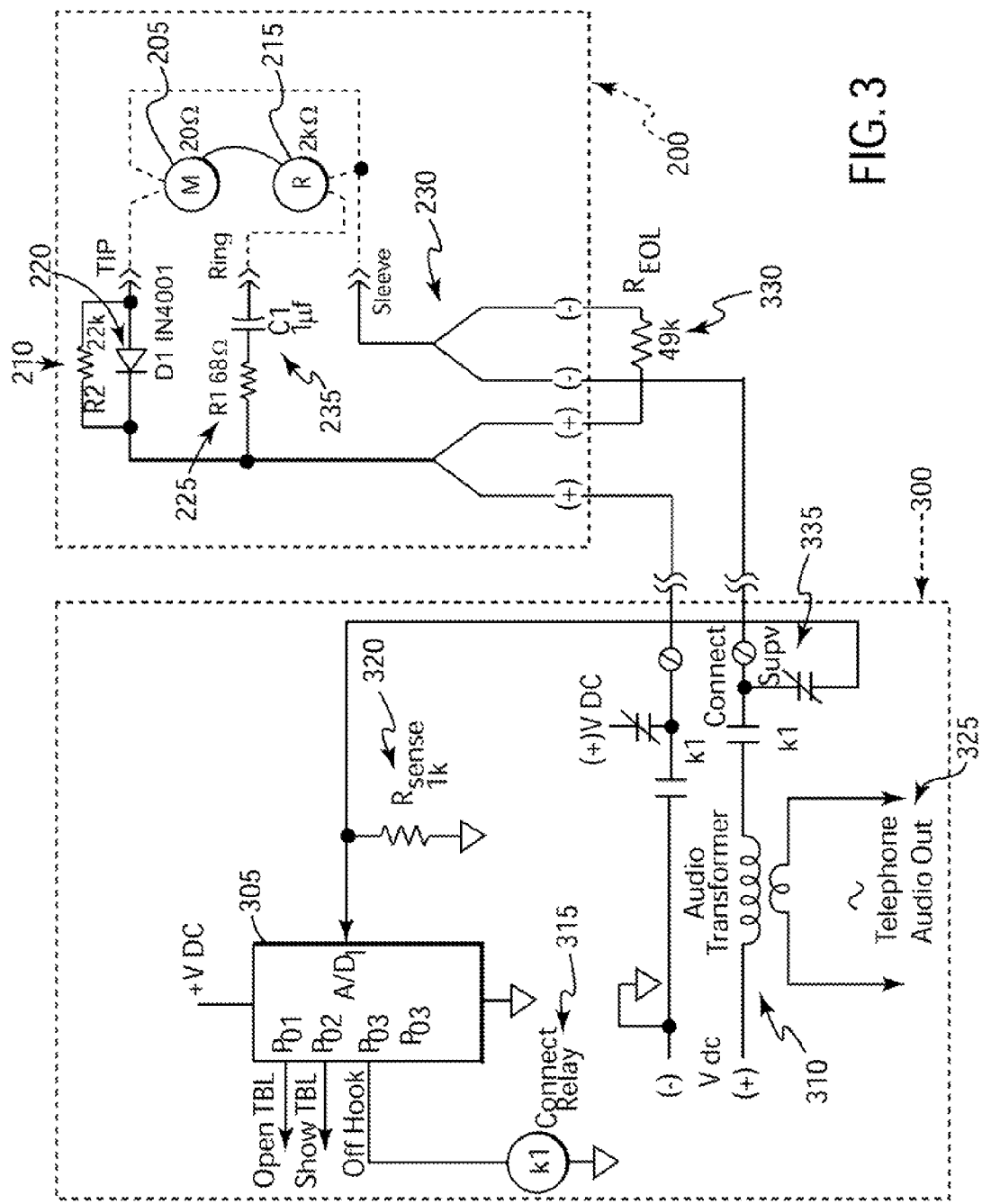
FIG. 3 a diagrammatic representation of the firefighter's telephone station of FIG. 2 being connected to a conventional telephone control panel shown in the normal supervisory mode.

Referring to FIG. 3, this figure is a diagrammatic representation of the firefighter's telephone system 200 connected to a telephone control panel 300 shown in the normal supervisory condition. In this case, the telephone control panel 300 provides a voltage across the external telephone wiring of the proper polarity to allow a trickle current to flow through the external end-of-line-resistor ($R_{eol}$) 330 ensuring wiring integrity.

If the telephone handset itself at this point has not been inserted into the receptacle, then the voltage developed at the input to the microprocessor 305 is determined by the ratio of $R_{eol}$ 330 and $R_{sense}$ 320. If an open or short condition were to occur, then the voltage would change accordingly so that either a normal, open, or shorted wiring condition would be detected.

Without the presence of a wiring fault and under normal supervisory condition, when the telephone handset is plugged-in, the R1 resistor 225, in series with the telephone microphone 205, would come into play because the polarity of the wiring is such that the diode 220 is reversed bias and the voltage divider $R_{eol}$ 330 and $R_{sense}$ 320 is now affected by the value of the R2 resistor 210 providing the input to the microprocessor 305 to represent a call-in signal.

Having said all the above, the telephone system 200 may be connected to a telephone control panel 300 that detects either 3-state or 4-state functions when the wiring is of the proper polarity. The need for two versions of a telephone system 200 is not required.

Alternate embodiments include using a signal generator at periodic intervals to determine the status of the line. This determination is known as time domain reflectometry (TDR). In this alternate embodiment, a signal from a signal generator is transmitted down the line. As the signal proceeds down the line, one of a number of things can occur. If the signal reaches a mismatch in impedance, a signal is reflected back. If there is no mismatch in impedance, then the signal is terminated and there is little if any reflection.

Once a signal is received back at the receiver, the condition of the line is analyzed. The transmitted signal and the reflected signal are analyzed and the voltage standing ratio is computed.

If a short wire is present, the reflected signal is inverted. If an open wire is present, the reflected signal is not inverted. If the line terminates, then little if any reflected signal is generated or detected.

In this embodiment, a receiver is located near or at the entry point of the transmitted signal. The receiver is located on the apparatus such that a reflected signal can be detected regardless of its position as related to the reflected signal.

It is possible in this embodiment to include a ground fault protection circuit if the line is energized. Therefore, initially, the line would have to be tested to determine whether it is energized.

The signal can be transmitted on a periodic basis such that the status of the line is known. For example, the line can be tested every thirty seconds or every 2 minutes. The frequency of testing the line is user defined.

Upon detecting a fault condition in a line, the present invention provides an alert in the system. This alert can be an automatically generated message that is sent to the appropriate personal or an audio or visual warning. The warning would alert the individuals as to the fault in the line such as a short or open circuit.

In a further alternate embodiment of the present invention, a log of the condition of the line is kept each time the line is tested. For example, in the alternate embodiment of the present invention, each time the line is tested, the date, time of testing and the results of the testing are contained in a log file, which can be used to exactly pinpoint the time of the fault condition. By pinpointing the time, a more thorough analysis can be completed as to possible causes for the error. The log file can also be used as an indication to predict a possible failure and therefore address the problem before any actual disruption in service.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. An emergency telephone handset, comprising:
   a microphone input;

a polarizing diode coupled in series with the microphone input; and a resistor coupled in parallel with the polarizing diode and in series with the microphone input and having an impedance, wherein the microphone input, the polarizing diode and the resistor are configured to be coupled with external telephone wiring that can be polarized by a telephone control panel circuit;

wherein, when the telephone handset is coupled with the external telephone wiring, the telephone control panel circuit differentiates between a shorted wiring and a call-in signal based on operation of the resistor and the polarizing diode by measuring the impedance at the telephone control panel circuit, wherein a first impedance of the measured impedance corresponds to a shorted wiring and a second impedance of the measured impedance corresponds to the telephone handset coupled to the external telephone wiring corresponding to the call-in signal, the second impedance is higher than the first impedance due to the effect of the resistor; and wherein the polarizing diode facilitates operating a telephone station with a 3-state central telephone panel and operating the telephone station with a 4-state central telephone panel, the resistor and the polarizing diode operative to permit the telephone handset to operate with a 3-state telephone control panel when a voltage having a first polarity is applied to the telephone station or with a 4-state telephone control panel when the voltage having a second, opposite polarity is applied to the telephone station, wherein said second, opposite polarity causes the polarizing diode to shunt the resistor by bypassing the resistor when the 4-state telephone control panel applies the voltage having the second, opposite polarity.

2. A telephone handset in accordance with claim 1, wherein the telephone control panel circuit monitors at least one of 3-states of a communication system and 4-states of a communication system, the resistor and the polarizing diode operative to permit the telephone handset to operate with a 3-state telephone control panel circuit when a voltage having a first polarity is applied across the external telephone wiring or with a 4-state telephone control panel circuit when a voltage having a second, opposite polarity is applied across the external telephone wiring.

3. A telephone handset in accordance with claim 2, wherein the telephone control panel circuit applies the voltage having the first polarity to the external telephone wiring when the telephone control panel circuit recognizes the call-in signal and applies the voltage having the second polarity when the telephone control panel circuit is in a supervisory condition.

4. A method for determining a condition of an emergency communication system, the emergency communication system including a central telephone control panel, at least one telephone station, and a communication device, the communication device is removably coupled to the at least one telephone station, said method comprising:

positioning a polarized diode in the communication system;

positioning a resistor in parallel with the polarized diode;

coupling the central telephone control panel to the at least one telephone station, the central telephone control panel configured to supply the at least one telephone station with a voltage having one of a first polarity and a second, opposite polarity;

configuring the central telephone control panel to identify a shorted wiring in the communication system between the central telephone control panel and the at least one telephone station by measuring an impedance within the communication system, wherein a first impedance of the measured impedance corresponds to the shorted wiring;

configuring the central telephone control panel to identify that the communication device is coupled to the at least one telephone station by measuring an impedance within the communication system, wherein a second impedance of the measured impedance corresponds to the coupled communication device, the second impedance is greater than the first impedance due to the effect of the resistor when the voltage has the first polarity; and reversing the first polarity of the voltage in response to the identification of the communication device coupled to the at least one telephone station, reversing the polarity causes the polarized diode to shunt the resistor, removing the impedance of the resistor from the communication system and allowing communication between the central telephone control panel and the at least one telephone station without the increased impedance from the resistor; and wherein the polarized diode facilitates operating the at least one telephone station with a 3-state central telephone panel and operating the telephone station with a 4-state central telephone panel, the resistor and the polarizing diode operative to permit a telephone handset to operate with a 3-state telephone control panel when the voltage having the first polarity is applied to the telephone station or with a 4-state telephone control panel when the voltage having a second, opposite polarity is applied to the telephone station, wherein said second, opposite polarity causes the polarized diode to shunt the resistor by bypassing the resistor when the 4-state telephone control panel applies the voltage having the second, opposite polarity.

5. A telephone station for use in an emergency communication system, the telephone station comprising:

an input device configured to couple a communication device to the telephone station;

a resistor coupled in series between the input device and a central telephone panel, the resistor increases an impedance within the emergency communication system when a communication device is coupled to the telephone station relative to an impedance within the emergency communication system when a shorted wiring is present between the central telephone panel and the telephone station; and a polarizing diode coupled in parallel with the resistor, wherein the polarizing diode facilitates operating the telephone station with a 3-state central telephone panel and operating the telephone station with a 4-state central telephone panel, the resistor and the polarizing diode operative to permit a telephone handset to operate with a 3-state telephone control panel when a voltage having a first polarity is applied to the telephone station or with a 4-state telephone control panel when the voltage having a second, opposite polarity is applied to the telephone station, said second, opposite polarity causes the polarizing diode to shunt the resistor by bypassing the resistor when the 4-state telephone control panel applies the voltage having the second, opposite polarity.

* * * * *